United States Patent [19]
Weng, Jr.

[11] 3,735,650
[45] May 29, 1973

[54] EXTRACTOR TOOL

[76] Inventor: Francis H. Weng, Jr., 4023 Redden Road, Drexel Hill, Pa. 19026

[22] Filed: Feb. 17, 1971

[21] Appl. No.: 116,070

[52] U.S. Cl. .................................................. 81/53.2
[51] Int. Cl. ............................................. B25b 13/50
[58] Field of Search .................... 81/53.2; 254/24, 254/18

[56] References Cited

UNITED STATES PATENTS

| | | | |
|---|---|---|---|
| 2,497,214 | 2/1950 | Dreyer | 81/53.2 |
| 1,485,974 | 3/1924 | Florian | 254/24 |
| 3,529,497 | 9/1970 | Brooks | 81/53.2 X |
| 1,498,040 | 6/1924 | Johnson | 81/53.2 |

Primary Examiner—James L. Jones, Jr.
Attorney—Denny & Denny

[57] ABSTRACT

An extractor tool comprising a collet and means for tightening the collet about a member (such as a studhead or the like) in which the follet has an annular array of pointed teeth which form the leading edge of the collet, which extend beyond the remainder of the collet, and which are the first portions of the collet to contact the studhead or the like. The pointed teeth are pyramid-like in shape and with a stop wall to the rear of the teeth define a notch which receives material of the studhead or the like which is displaced by the teeth as the collet is tightened about the studhead.

3 Claims, 8 Drawing Figures

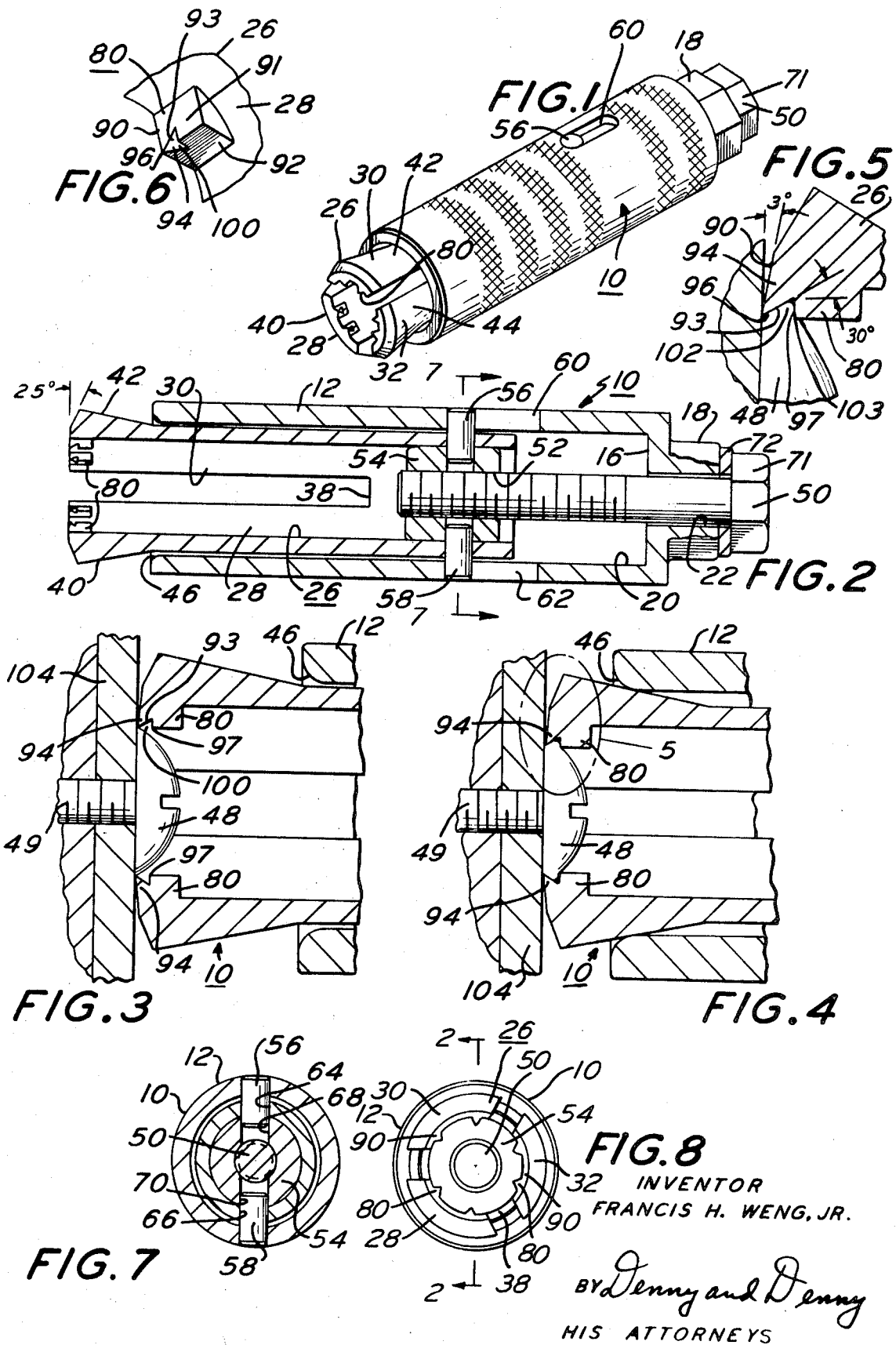

EXTRACTOR TOOL

BRIEF SUMMARY OF THE INVENTION

This invention relates generally to tools for extracting members such as screwheads, studheads, nuts, rivets and the like which for various reasons can no longer be removed in more common ways.

Many of us, in this do-it-yourself era, have from time-to-time been faced with the need for removing a screw which will not yield to the force which we can manually apply with a screw driver or in which the groove in the head has been distorted so that a screw driver is of little help.

Extractor tools have been previously patented to provide means for aiding in the removal of such screws and the like and it is an object of my invention to improve the known extractor tools by providing a wall structure at the front of the tool which penetrates the head of the screw or the like and displaces some of the material of the screwhead into an undercut notch for the purpose of assisting in keeping the tool on the screwhead.

In one embodiment, I provide an extractor tool comprising a collet and means for tightening the collet about a member (such as a studhead or the like) in which the collet has an annular array of pointed teeth which form the leading edge of the collet, which extend beyond the remainder of the collet, and which are the first portions of the collet to contact the studhead or the like. The pointed teeth are pyramid-like in shape and with a stop wall to the rear of the teeth define a notch which receives material of the studhead or the like which is displaced by the teeth as the collet is tightened about the studhead and the teeth pinch into and penetrate the studhead.

The foregoing and other objects of this invention, the principles of this invention and the best modes in which I have contemplated applying such principles will more fully appear from the following description and accompanying drawings in illustration thereof.

BRIEF DESCRIPTION OF THE VIEWS

In the drawings,

FIG. 1 is a front and top perspective view of my extractor tool;

FIG. 2 is an enlarged cross-sectional view of the extractor tool shown in FIG. 1 and taken along the line 2—2 in FIG. 8;

FIGS. 3 and 4 are further enlarged partial sectional views of the front portion of the tool shown in FIGS. 1 and 2 showing it as it just engages the work plate and screwhead in FIG. 3 and when it has penetrated into the screwhead the full amount in FIG. 4;

FIG. 5 is a further enlarged view of the section labelled "5" in FIG. 4;

FIG. 6 is a perspective view of one of the wall structures which extend from the interior of the collet, the view being taken from the inside;

FIG. 7 is a cross-sectional view taken along the line 7—7 in FIG. 2 at about the scale it is shown in FIG. 2; and FIG. 8 is a front view of the extractor tool at about the scale it is shown in FIG. 2.

DETAILED DESCRIPTION

Referring to the drawings, the extractor tool 10 comprises a tubular sleeve 12 open at its forward end (left end), as shown in FIGS. 1 and 2, and partially closed at the other end (right end) by a radially inwardly extending flange 16. The flange 16 extends axially outwardly and forms a hexagonally shaped end 18 adapted to receive a suitable tool, such as a wrench.

The sleeve 12 has an axial bore 20 which extends from the open end thereof to the flange 16 and a bore 22, of smaller diameter than the bore 20, but communicating therewith, extends through the flange 16 and hexagon end 18.

The sleeve 12 slidably receives a collet 26, as shown, within the bore 20. The collet 26 comprises an annular array of three fingers 28, 30 and 32 axially extending from an integral ring 38 (FIG. 2). Each of the fingers 28, 30 and 32 has a forward, enlarged jaw 40, 42 and 44, respectively, arranged in an annular array.

The jaws 40, 42 and 44 extend beyond the sleeve 12 and each has an outer tapered surface of greater diameter than the bore 20 and engageable with the inner chamfered edge 46 of the sleeve 12 for flexing the fingers 28, 30 and 32 inwardly to embrace the head 48 of a screw 49 to be extracted from the work plate 104.

A tightening bolt 50 is slidably received through the bore 22 (of the hexagon end 18 and the flange 16) and extends beyond the flange 16 into the bore 20 and into a mating, threaded opening 52 in a bushing 54 which is secured to the ring 38 and the collet 26 by aligned pins 56 and 58. The sleeve 12 is provided with key-slots 60 and 62 which slidably receive the outer ends of the pins 56 and 58, the key-slots 60 and 62 being aligned opposite to each other, as shown. The pins 56 and 58 are driven through slightly smaller holes 64 and 66 in the ring 38 and into slightly smaller holes 68 and 70 in the bushing 54 so as to provide interference fits and thereby secure the bushing 54 and collet 26 to each other while providing for keyed movement relative to the sleeve 12.

The bolt 50 has a hexagon head 71 adapted to receive a suitable tool and between the head of the bolt 50 and the hexagon end 18 may be placed a washer or ring 72 to provide a freely rotatable thrust bearing against the end surface of the hexagon end 18.

Referring to each of the jaws 40, 42 and 44, each jaw has two wall structures 80 extend radially inwardly to penetrate the screwhead 48 and better secure the jaws of the collet 26 thereto during the extraction operation. Each wall structure 80 is placed adjacent the arcuate ends of the fingers 28, 30 and 32, as shown in FIGS. 1 and 8, and thus are approximately equi-spaced about the screwhead 48.

In other words, in FIG. 5, the tooth 94 has the general shape of an inverted pyramid tipped to one side with its point 96 the forwardmost portion of the collet 26.

The collet 26 has a segmented, annular front surface which is tapered back away from the point 96, as shown in FIGS. 3, 4 and 5. The front surface is formed by the surfaces 90 which extend radially outwardly beyond each wall structure 80. The surfaces 90 are inclined, in my preferred embodiment at about 3°, as shown and continue radially outwardly of the teeth 94 to form a segmented annulus. Radially beyond the segmented annulus, the front surface is tapered at a greater angle, about 25°, in my preferred embodiment, as shown.

In each wall structure 80, the sloping undercut surface 93 together with a radial (vertical) surface 97, see FIG. 3, together form an undercut recess or notch 100 to receive material 102 (FIG. 5) of the head 48 displaced radially outwardly as each tooth 94 penetrates the head 48.

Also, the radial surface 97 together with the side surfaces 91 and 92 define a stop point 103 which engages the screwhead 48, as shown in FIGS. 4 and 5. The stop point 103 prevents the tooth 94 from slipping off the head 48 and behind the head 48 into the space which sometimes may exist between the head 48 and the work plate 104. Also, as the screw 49 is removed, there would otherwise be a tendency for the teeth 94 of the tool to slip between the undersurface of the screwhead 48 and the work plate 104. Further, the stop point 103 has a tendency to embed itself in the screwhead 48 further resisting the tendency of the collet to rotate relative to the screwhead, FIG. 5, although the extent to which it is embedded depends on the profile of the screwhead 48.

To extract a screwhead or the like, the extractor 10 is placed over the screwhead so that the jaws surround the head, the front surface being held tightly against the work plate 104, as shown in FIG. 3. While the sleeve 12 is gripped with one hand (and to more tightly grasp the sleeve 12, its outer surface may be knurled, as shown), a wrench is applied to the head 71 of the stud 50 and the collet 26 drawn tight against the screwhead. At this time the leading edge of the teeth is simultaneously engaging the work plate 104 and the screwhead 48. As the collet 26 is tightened, there is a tendency for the teeth to slide off of the rounded screwhead, but a force is applied to the sleeve tending to keep the collet against the work plate to prevent this.

This force is required only until the teeth penetrate the screwhead sufficiently to displace screwhead material radially outwardly which flows into the undercut notch 100. Once some screwhead material displacement takes place, the displaced material tends to resist any sliding off motion of the teeth 94.

Once the collet grips the screwhead securely, a wrench is then applied to the hexagon end 18 to rotate the screw 49, collet 26 and sleeve 12 jointly and thereby remove the screw from the work plate 104.

In the preferred embodiment, the stud 50 has a right hand thread so that clockwise rotation of the head 50 will draw the collet into the sleeve and cause the fingers 28, 30 and 32 to flex inwardly. Thereafter, a counterclockwise force applied to the hexagon end 18 is used to remove the screw 49 from the work plate 104.

In another embodiment, the stud 50 was provided with a left hand thread so that counterclockwise rotation of the stud caused the collet to be tightened about the screw until the sharp point 96 was firmly seated on the screwhead and thereafter continued clockwise motion of the stud caused the screw 49 to be unthreaded from the work plate 104.

While the teeth 94 have been shown as pyramid-like, it is seen that they could be cone-like also.

Further, while the notch 100 has been shown as formed by an inclined surface 100 and a vertical surface 97 it is seen that it could have other shapes.

I have found that my tool has great tenacity and that it is sufficient if only a small part of the item to be extracted is exposed, i.e., about one-sixteenth of an inch.

Thus, I have provided an improved tool for the removal of screws, nuts and bolts, which for many reasons have become difficult or impossible to remove for various reasons.

I claim:

1. An extracting tool for embracing members such as studheads, screwheads, nuts and the like of different sizes and then extracting same comprising a collet, said collet including an annular array of jaws, each jaw having a radially inwardly extending wall structure for simultaneously penetrating said members and receiving material displaced during said penetration, said wall structure including an inverted truncated pyramid-like pointed tooth defined in part by a surface which forms, in part, the forwardmost part of said collet and an opposite surface which receives material of said member which is displaced during the penetration.

2. An extracting tool comprising a collet and means for tightening said collet about a member such as a studhead or the like wherein said collet has an annular array of pointed teeth which form the leading edge of said collet, which extend beyond the remainder of the collet, and which are the first portions of said collet to contact the studhead or the like, each tooth being pyramid-like or conical-like in shape and defining with stop walls to the rear of each tooth, a notch which receives material of said member which is displaced by each tooth as the collet is tightened about said member.

3. An extracting tool for embracing members such as studheads, screwheads, nuts and the like of different sizes and then extracting same comprising a collet, said collet including an annular array of jaws, each jaw having a radially inwardly extending wall structure for simultaneously penetrating said members and receiving material displaced during said penetration, said wall structure including an annular array of pointed teeth at the forward-most portion of said collet and radially outwardly extending undercut and recessed notches defined in part by said teeth, each tooth having an inverted truncated pyramid-like or cone-like pointed shape defined in part by a surface which forms, in part, the forwardmost part of said collet and an opposite surface which receives material of said member which is displaced during said penetration, said opposite surface forming part of said recessed notch to receive said displaced material, and stop walls which together with said teeth define said notches and limit radially inward movement of said teeth, the radially inner parts of said teeth forming the leading edge of said collet which extends beyond the remainder of the collet and being the first portion of said collet to contact said member, and means for tightening said collet about said member.

* * * * *